United States Patent [19]

Cushman et al.

[11] Patent Number: 4,557,514

[45] Date of Patent: Dec. 10, 1985

[54] VACUUM PICK AND PLACE ROBOTIC HAND

[75] Inventors: Robert H. Cushman, Princeton Township, Mercer County, N.J.; Carl L. Hoegermeyer, Buckingham Township, Bucks County, Pa.

[73] Assignee: AT&T Technologies, Inc., Berkeley Heights, N.J.

[21] Appl. No.: 632,164

[22] Filed: Jul. 18, 1984

[51] Int. Cl.[4] .................... B65G 47/91; B66C 1/02
[52] U.S. Cl. ................... 294/64.1; 248/362; 269/21; 901/40
[58] Field of Search ............... 294/64 R, 64 A, 64 B, 294/65; 29/743; 248/362, 363; 269/21; 271/94, 103, 107; 279/3; 414/627, 737, 744 B, 752; 901/40

[56] References Cited

U.S. PATENT DOCUMENTS

| | | | |
|---|---|---|---|
| 750,667 | 1/1904 | Lewellyn et al. | 294/65 |
| 2,163,441 | 6/1939 | von Hofe | 294/64 R |
| 3,158,381 | 11/1964 | Yamamura | 248/362 X |
| 3,389,682 | 6/1968 | Gardner | 269/21 X |
| 3,865,359 | 2/1975 | Caroli | 294/65 X |
| 3,929,234 | 12/1975 | Warren | 414/737 |
| 3,949,295 | 4/1976 | Moorshead | 269/21 X |
| 4,006,909 | 2/1977 | Ollendorf et al. | 279/3 |
| 4,119,211 | 10/1978 | Boyer et al. | 214/1 BH |
| 4,138,692 | 2/1979 | Meeker et al. | 357/82 |
| 4,162,018 | 7/1979 | Arya | 294/64 R X |
| 4,221,356 | 9/1980 | Fortune | 269/21 X |
| 4,351,518 | 9/1982 | Stievenart | 294/64 R X |
| 4,428,815 | 1/1984 | Powell et al. | 248/362 X |

*Primary Examiner*—Johnny D. Cherry
*Attorney, Agent, or Firm*—M. M. de Picciotto; R. B. Levy

[57] ABSTRACT

A hand (10) capable of simultaneously handling a plurality of articles (11) comprising a pickup head (15) having a plurality of vacuum pickup cavities (18), each cavity substantially matching the size and shape of the article to be handled. In one embodiment, the pickup head comprises a seal (26) positioned around an article-matching cavity (18) thereof and an opening (19) therethrough for communicating the cavity (18) with a vacuum chamber (20). In another embodiment, the pickup head comprises, positioned within its opening, a bellows (48) having a cylindrical sleeve (51) at one end and a planar flange (49) coupled to the vacuum chamber (20) by means of a seal (52) at its other end.

5 Claims, 3 Drawing Figures

4,557,514

VACUUM PICK AND PLACE ROBOTIC HAND

TECHNICAL FIELD

The present invention relates generally to the field of manipulators, and more particularly, to an improved vacuum pick and place robotic hand for handling articles.

BACKGROUND OF THE INVENTION

Over the past few years, industrial manufacturing production lines have included an increasing number of automated processes using programmable manipulators or robots. These robots simulate the hand, arm and wrist movements of a machine operator with consistent accuracy and without any risk to operator personal injury or fatigue. A variety of such robots have been proposed and are commercially available in various sizes, specifications and performances. One such commercially available robotic arm is the SEIKO Model 700 pick and place robot manufactured by Seiko Instruments Inc. of Japan. Such a known arm is capable of performing four basic motions usually required in a manufacturing or part assembly process.

In the manufacture of large scale integrated semiconductor devices, it is usually necessary to first form the various circuit elements in a semiconductor wafer and then to cut the processed wafer into a plurality of individual integrated circuit (IC) chips. The latter are, in turn, mounted and assembled in individual packages called chip carriers varying in size, shape and type. Current IC chip mounting processes require the preheating of a package and the placing of an Au-P preform in a cavity of the package thereby forming a eutectic bond between the IC chip and the package. Chip protection is typically provided in a lid sealing operation where a gold plated lid is attached to the package. Such a lid sealing operation requires a very accurate positioning of the lid with respect to the chip carrier to achieve a reliable chip protection technique.

As integrated semiconductor IC packages are becoming smaller in size with the demand for such packages having recently substantially increased, the miniaturization of the IC packages renders unattractive any technique using a manual lid sealing operation. Indeed, in a manufacturing environment, such an operation would yield small throughput, would be labor intensive and would cause substantial reliability problems due to operator fatigue. Therefore, there exists a need for an apparatus (e.g., a robotic hand) of the pick and place type capable of accurately and reliably handling articles, in a manufacturing environment, while substantially avoiding the above-discussed difficulties.

SUMMARY OF THE INVENTION

The foregoing need is met in an illustrative embodiment of the invention wherein an apparatus for handling an article comprises a pickup head having first and second planar surfaces, the head having a cavity formed therein proximate to its first planar surface and substantially conforming to the geometry of an article to be handled; and means located within the pickup head and extending between the first and second planar surfaces thereof for selectively retaining or releasing an article to be handled in or out of the cavity, respectively.

In accordance with one embodiment of the invention, the means for selectively retaining or releasing an article comprise an opening formed in the pickup head for communicatively coupling the cavity with a vacuum chamber proximate to the second planar surface of the pickup head.

In a preferred embodiment of the invention, the opening comprises selectively contractable or expandable means positioned therein and including an elongated bellows having a first and a second end portion, the bellows being dimensioned to slide within the opening; a flange attached to the first end portion of the bellows and having a central aperture communicatively coupled to the chamber; and a sleeve attached to the second end portion of the bellows and dimensioned to slidably fit within the opening.

DETAILED DESCRIPTION

Figure 1:
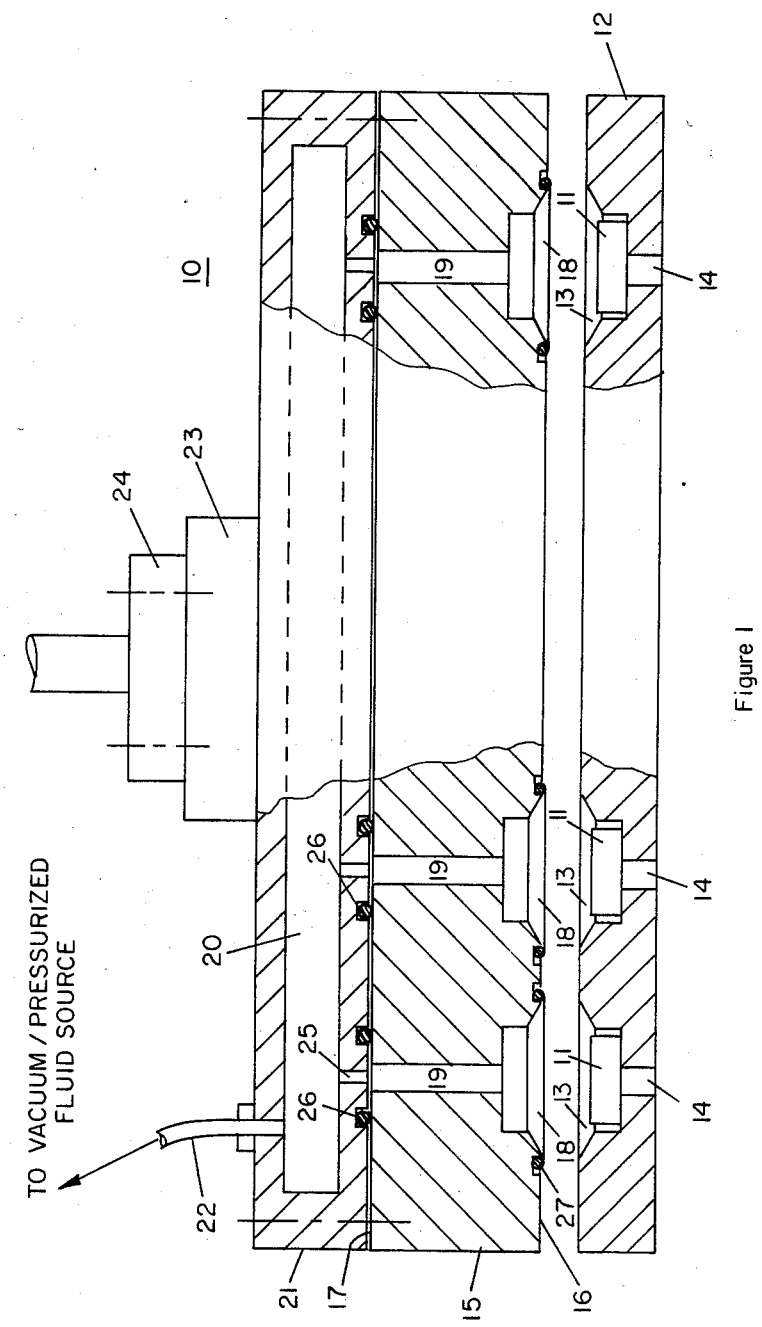
FIG. 1 illustrates an enlarged partial cross-sectional view of a hand in accordance with one embodiment of the invention.

Shown in FIG. 1 is a hand 10 for handling one or a plurality of articles 11 located in an article-receiving plate 12. Each one of the articles 11—11 to be handled by the hand 10 is located in a cavity 13 formed in the upper surface of the article-receiving plate 12. A through hole 14 formed in the plate 12 connects the cavity 13 with the lower surface of the plate 12. The articles 11 held in the plate 12 may include chip carriers, lids for chip carriers, or other relatively flat electronic components commonly used in the electronics industry.

The hand 10 comprises a plate-like pickup head 15 having a first planar surface 16 and a second planar surface 17, and a cover 21 sealably attached to the pickup head 15. For purpose of illustration only, a cross-sectional view of a portion of the hand 10 in accordance with one embodiment of the invention is shown. As shown, the first planar surface 16 of the pickup head 15 has a plurality of cavities 18 formed therein. Each cavity 18 is dimensioned to substantially match the dimensions, size and shape of the articles 11 to be handled by the hand 10. As will be explained in connection with the operation of the hand 10, the cavities 18 are designed to receive and to retain therein the articles 11 to be handled.

In accordance with an embodiment of the invention, each one of the cavities 18 communicates with a vacuum or pressurized fluid source (not shown) via an opening 19 located within the pickup head 15 and extending between its first and its second planar surfaces 16 and 17. As shown in FIG. 1, the opening 19 couples the cavity 18 with a chamber 20 via an orifice 25 formed in the cover 21 which, in turn, is sealably attached to the second planar surface 17 of the pickup head 15 by means of a sealing member 26. The chamber 20 is coupled, via a conduit 22, to a vacuum source or to a source of pressurized fluid, e.g., air (not shown). As illustratively shown, a hand mounting base 23 formed on or attached to the cover 21 may be connected to a wrist flange portion 24 of a robotic arm (not shown) or to some other selectively movable apparatus. Also, positioned around the periphery of each one of the cavities 18 is a sealing element 27, e.g., an O-ring, made of a compliant-type material. Alternatively, a single sealing element may be used and positioned around all the cavities 18 formed in the pickup head 15.

The operation of the hand 10 in accordance with the present invention will be hereafter described with reference to the handling of one article 11 out of the receiving plate 12 by means of the hand 10. However, applying the present inventive teachings to simultaneously handling a plurality of articles 11, whether arranged in an array of articles or in a single row of articles, is well within the spirit and scope of the present invention.

Referring to FIG. 1, first the hand 10 is moved toward the article-receiving plate 12 until the sealing element 27 contacts the upper surface of the plate 12 thereby sealing the two cavities 13 and 18. Next, vacuum is applied to the chamber 20 via the conduit 22. This results in vacuum being applied to the pickup head cavity 18 via the orifice 25 and the opening 19. The article 11 being located in the plate-cavity 13 will thus be transferred to the head-cavity 18 with its initial orientation maintained. The article 11 is retained in the cavity 18 by means of the applied vacuum. Without interrupting the applied vacuum, the hand 10 with the article 11 held therein may now be moved away from the plate 12 to another location or work station. The release of the article 11 out of the cavity 18 while maintaining its initial orientation may be achieved by interrupting the vacuum and allowing the article 11 to "drop out" of the cavity 18 under the effect of gravity. Alternatively, a source of pressurized air may be coupled, via the conduit 22, to the chamber 20 in order to "push" the article 11 and release it out of the cavity 18.

Successful transfer of a plurality of articles 11 from the plate 12 into the cavities 18 is achieved by adequately selecting the size of the orifices 25 as a function of the applied vacuum and the overall articles' characteristics. Similarly, the size of the orifices 25 will determine whether the articles are successfully transferred when one or more article is missing from, or misaligned within, the plate 12. In accordance with an embodiment of the invention, the initial orientation of the plurality of articles 11 is maintained while the articles are transferred from the plate 12 into the pickup head 15. Also, the center-to-center spacing between the articles 11 is maintained during all of the article handling steps.

Figure 2B:
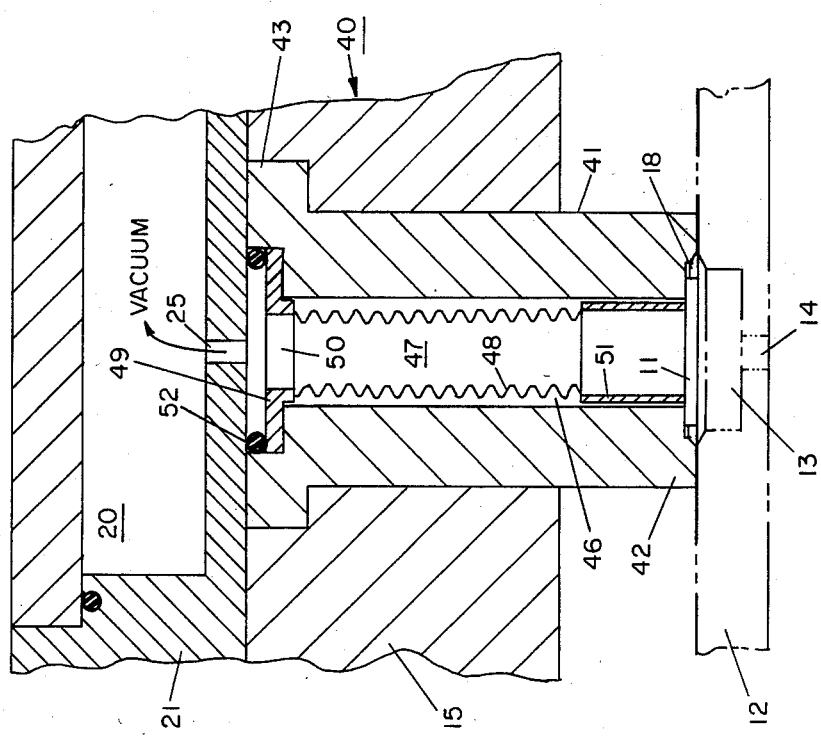
FIGS. 2A and 2B illustrate portions of a robotic hand, in two different positions, in accordance with a preferred embodiment of the invention.
Figure 2A:
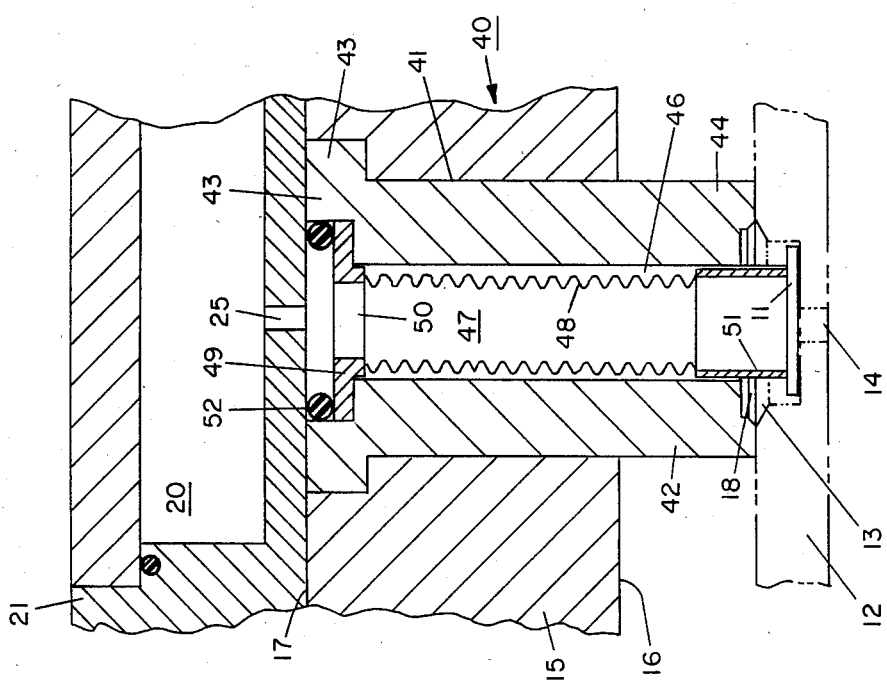

Referring now to FIGS. 2A and 2B wherein a portion of a robotic hand 40 in accordance with a preferred embodiment of the invention is shown in two different operational positions. Various structural elements of this robotic hand 40 have identical reference numerals to the numerals of the hand 10 of FIG. 1 to illustrate the similarities of these two embodiments.

The plate-like pickup head 15 has a through hole 41 formed therein and extending between its first planar surface 16 and its second planar surface 17. An elongated tubular body 42 is positioned within the through hole 41 with one end portion 43 thereof flush with the second planar surface 17. The other end portion 44 of the tubular body 42 may also be flush with the first planar surface 16, or may extend away from the first planar surface 16 as shown. In either case, the cavity 18 which substantially matches the dimensions, size and shape of the article 11 to be handled by the hand 40 is formed in the end portion 44 of the tubular body 42 which is a mere extension of the pickup head 15. The tubular body 42 has an opening 46 extending longitudinally therein between its two end portions 43 and 44. The opening 46, which also extends between the two planar surfaces 16 and 17 of the pickup head 15 communicatively couples the cavity 18 with the chamber 20 formed in the cover 21 attached to the pickup head 15.

In accordance with a preferred embodiment of the invention, a selectively expandable and contractable member 47 is positioned within the opening 46 of the tubular body 42. The member 47 comprises an elongated bellows 48 dimensioned to a loose slide non-contact fit within the opening 46. The outer diameter of the bellows 48 is selected such that it remains clear from the wall of the opening 46 thereby resulting in stick-free operation as well as a substantially increased operational life of the bellows.

Attached to the upper stationary end of the bellows 48 is a flange 49 having a central aperture 50 and adapted to fit and sit in the end portion 43 of the tubular body 42. At the lower free end of the bellows 48 is a sleeve 51 attached thereto and dimensioned to a tighter slide fit within the opening 46 so as to keep the bellows 48 centered in the opening 46. A sealing ring 52 is located between the flange 49 and the cover 21 to prevent leaks when vacuum is applied to the chamber 20. The tubular body 42 may be removed out of the through hole 41 for repair or maintenance purposes. Moreover, the tubular body 42 may be easily replaced when a different shape cavity 18 is needed to handle a different type article 11.

In operation, the robotic hand 40 is lowered toward the article-receiving plate 12 such that the lower end of the sleeve 51 contacts the surface of the article 11 as shown in FIG. 2A. As the vacuum is applied to the chamber 20, the bellows 48 contracts thereby pulling the article 11 toward the pickup head 40 into the cavity 18 thereof as shown in FIG. 2B. In order to unload the article 11 from pickup head 40 onto a receiving plate (such as 12), the vacuum is turned off causing the spring action of the bellows 48 to expand, thus pressing or pushing the article 11 out of the cavity 18 into a receiving cavity of the plate. The slide fit between the bellows 48/sleeve 50 and the opening 46 causes, when the bellows 48 contracts during the pickup of an article 11, a puff of air to be created between the selectively contractable and expandable member 47 and the opening 46. The foregoing prevents any particles from entering the space between the outer diameter of the bellows 48 and the confining walls of the opening 46.

Thus, in accordance with an embodiment of the invention, the vacuum is used to pull the article 11 into the cavity 18 and, when the vacuum is released, the bellows 48 acts as a spring to push the article 11 into an article-receiving cavity (such as 13). In other words, the bellows 48 has dual useful functions in both operational cycles of the hand 40, i.e., in the pickup mode and in the release mode.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. An apparatus for handling an article comprising:
   a pickup head having first and second planar surfaces, the pickup head having a cavity formed therein proximate its first planar surface and substantially conforming to the geometry of an article to be handled;

an opening formed in the pickup head for communicatively coupling the cavity with a chamber proximate the second planar surface of the pickup head;

an elongated bellows having a first and a second end portion, said bellows being dimensioned to slide within said opening;

a flange attached to the first end portion of the bellows and having a central aperture communicatively coupled to the chamber; and a sleeve attached to the second end portion of the bellows and dimensioned to slidably fit within said opening.

2. An apparatus according to claim 1, wherein a portion of said sleeve extends away from said cavity in the absence of vacuum applied to the chamber.

3. An apparatus according to claim 1, wherein, in response to vacuum applied to the chamber, the sleeve when contacting an article slides into the opening as said bellows contracts within said opening.

4. A robotic hand for simultaneously handling a plurality of articles comprising:

a plate-like pickup head having first and second planar surfaces;

a plurality of cavities formed in the pickup head proximate to the first planar surface thereof, said cavities substantially matching the respective size and shape of the articles to be handled;

a like plurality of openings located within the pickup head and extending between the first and the second planar surface thereof for communicatively coupling a corresponding one of said plurality of cavities to a source of vacuum;

a like plurality of selectively retractable and expandable means slidably fitting within said openings for simultaneously retaining and releasing the plurality of articles to be handled in and out of said cavities, each said retractable and expandable means including:

an elongated bellows having a first and a second end portion, said bellows being dimensioned to slide within its corresponding opening;

a flange attached to the first end portion of the bellows and having a central aperture communicatively coupled to the source of vacuum; and a sleeve attached to the second end portion of the bellows and dimensioned to slidably fit within its corresponding opening.

5. Method for simultaneously transferring a plurality of articles from a first work station to a second work station comprising the steps of:

directing to the first work station an apparatus having a plurality of article-matching cavities formed therein, each cavity having an opening therein which receives a bellows provided with a flange at its upper end having a central aperture, and the bellows having a sleeve at its lower end which is dimensioned to fit within the opening in said cavity;

aligning the sleeve at the lower end of the bellows in each cavity with a separate one of the plurality of articles located at the first work station;

applying vacuum to said plurality of cavities to retract each of the bellows from its normal expanded state and thereby pull the plurality of articles into their corresponding matching cavities while maintaining their initial orientation and spacing;

moving the apparatus with the plurality of articles held therein to the second work station; and interrupting the vacuum to cause each bellows to return to its expanded state thereby releasing the articles in their initial orientation and spacing out of their corresponding matching cavities onto the second work station.

* * * * *